US006276617B1

(12) United States Patent
Lenhardt

(10) Patent No.: US 6,276,617 B1
(45) Date of Patent: Aug. 21, 2001

(54) AGRICULTURAL LIQUID APPLICATION NOZZLE, SYSTEM, AND METHOD

(75) Inventor: Theodore F. Lenhardt, Winter Garden, FL (US)

(73) Assignee: Magspray Corporation, Winter Garden, FL (US)

(*) Notice: Subject to any disclaimer, the term of this patent is extended or adjusted under 35 U.S.C. 154(b) by 0 days.

(21) Appl. No.: 09/475,815

(22) Filed: Dec. 30, 1999

(51) Int. Cl.[7] .......... B05B 1/14

(52) U.S. Cl. .......... 239/590; 239/172; 239/302; 239/600; 239/DIG. 11; 239/DIG. 19; 47/1.7; 210/222; 210/695

(58) Field of Search .......... 239/1, 73, 172, 239/302, 590, 590.3, 590.5, 575, 600, 690, 690.1, DIG. 11, DIG. 19; 47/1.3, 1.7, 48.5, 58; 210/222, 695

(56) References Cited

U.S. PATENT DOCUMENTS 3,195,264 7/1965 Ward, Jr. .
4,666,089 5/1987 Inculet .
4,673,132 6/1987 Inculet et al. .
4,762,274 8/1988 Burls et al. .
4,925,103 5/1990 Muench et al. .
5,052,628 * 10/1991 Wainwright et al. .......... 239/690
5,080,289 1/1992 Lunzer .
5,222,324 * 6/1993 O'Neall et al. .......... 47/1.7
5,228,621 7/1993 Wilson et al. .
5,585,626 * 12/1996 Beck et al. .......... 47/1.7 X
5,793,035 * 8/1998 Beck et al. .......... 47/1.7 X
5,833,144 * 11/1998 Kinter .......... 239/590.3

FOREIGN PATENT DOCUMENTS

1212606 A 2/1986 (SU) .

* cited by examiner

*Primary Examiner*—David A. Scherbel
*Assistant Examiner*—Steven J. Ganey
(74) *Attorney, Agent, or Firm*—Allen, Dyer, Doppelt, Milbrath & Gilchrist, P.A.

(57) ABSTRACT

A spraying nozzle, system, and associated methods for applying a liquid to foliage are provided. A container having an opening supplies liquid to be sprayed to a nozzle that includes a spray tip at an upstream end. The nozzle is made of an inert material, and a magnet is affixed adjacent the spray tip's orifice along the liquid pathway. The liquid is pumped out of the container, passing by and contacting the magnet, which affects the liquid droplets by orienting the dipoles of the molecules comprising the liquid. This serves to reduce the droplet size owing to mutual repulsion, creating a "cloud" of spray. The smaller droplets are better able to penetrate smaller spaces in the foliage such as insect habitats and difficult-to-access foliage pockets. The transient magnetization also increases the attraction of the droplets for the foliage, which thereby further increases the efficiency of spraying and coverage achieved.

8 Claims, 2 Drawing Sheets

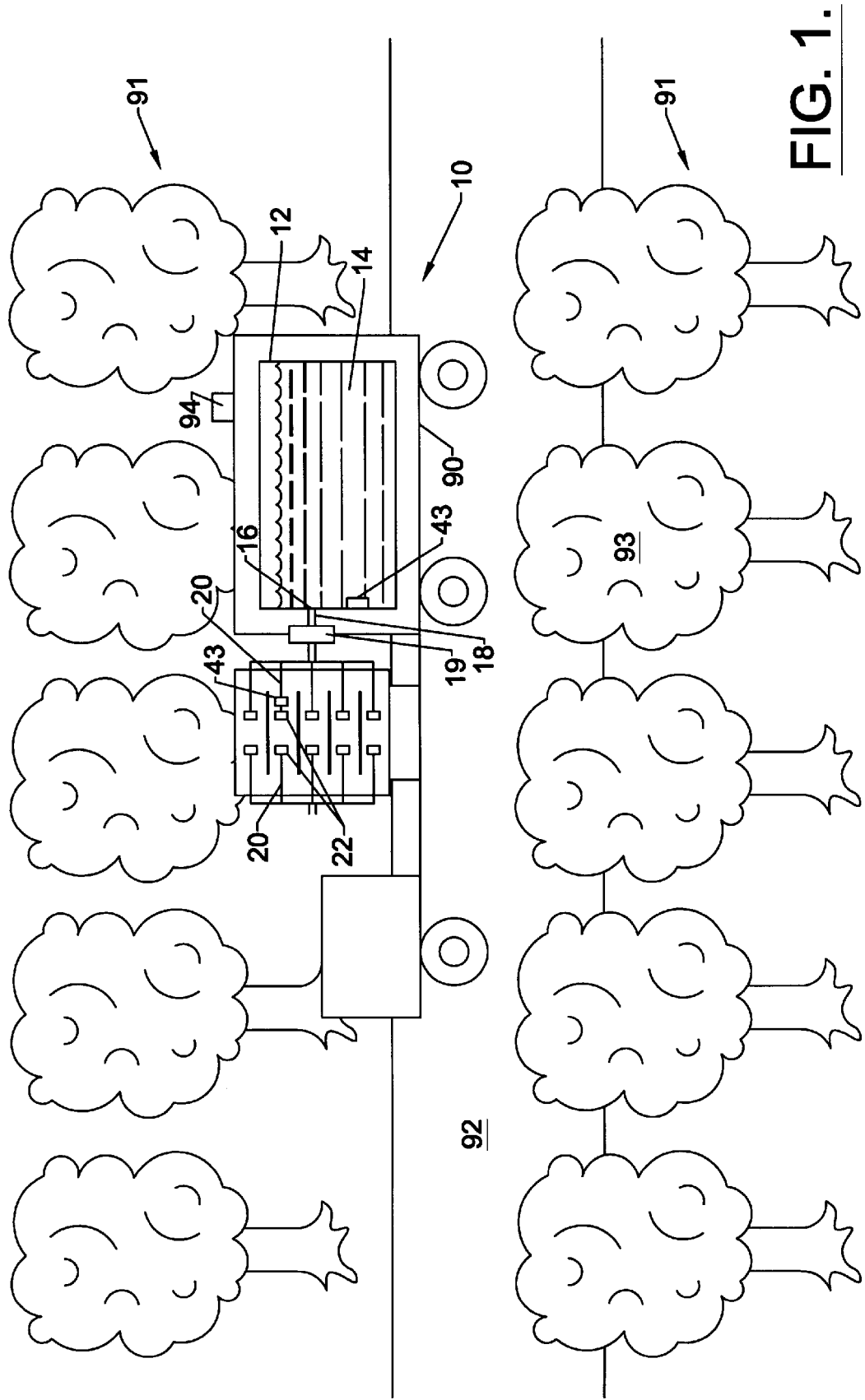

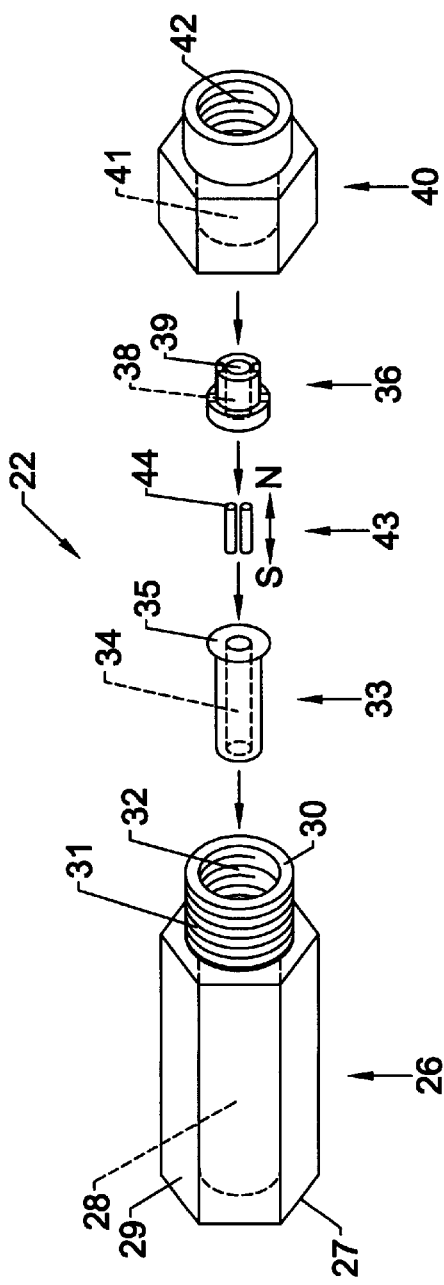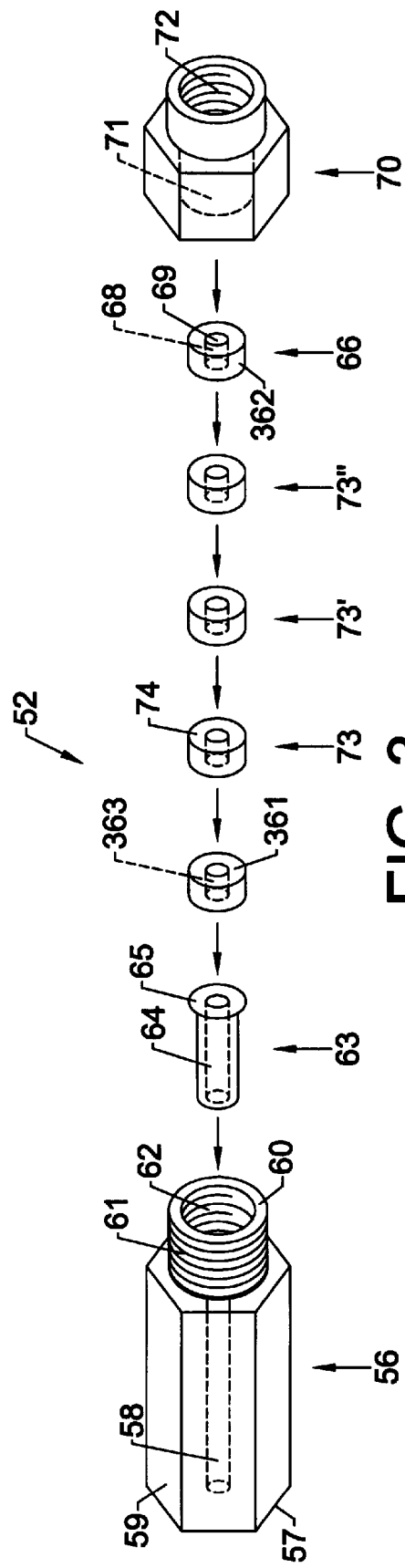

AGRICULTURAL LIQUID APPLICATION NOZZLE, SYSTEM, AND METHOD

BACKGROUND OF THE INVENTION

1. Field of the Invention

The present invention relates to systems and methods for applying liquids to foliage and, more particularly, to such systems and methods employing liquids under pressure through a nozzle.

2. Description of Related Art

The spraying of crops and other foliage is known to be accomplished with the use of nozzles through which liquid under pressure is forced and directed to the desired target area, typically the leaves. Concentrate sprayers have difficulties owing to impingement and even distribution of spray particles throughout large target areas. Low-volume sprayers offered some promise in the reduction of the use of spray chemicals, but posed problems of drift and consequent potential contamination of crops, animals, and people. Electrostatic sprayers addressed the drift problem but have proved too complicated and impractical for grower use.

In order to optimize application efficiency, systems have been devised for sensing the location of the foliage and controlling the direction of the spray toward the sensed location. Such systems have lessened the amount of chemical required to be sprayed but still did not address the problem of drift, which can amount to 50% loss of sprayed chemical.

The charging of sprayed liquid has been disclosed by Ward (U.S. Pat. No. 3,195,264), Inculet et al. (U.S. Pat. Nos. 4,666,089 and 4,673,132), Burls et al. (U.S. Pat. No. 4,762,274), Lunzer (U.S. Pat. No. 5,080,289), and Wilson et al. (U.S. Pat. No. 5,228,621). A magnetic-field-generating nozzle for atomizing a molten metal stream into a particle spray is taught by Muench et al. (U.S. Pat. No. 4,925,103). The use of a permanent magnet to increase the efficiency of applying paint has been disclosed by Romanov (SU 1212-606-A). In this device the magnet is outside the spray nozzle and does not come into direct contact with the paint. Further, the sprayer components are not inert.

SUMMARY OF THE INVENTION

It is therefore an object of the present invention to provide a spray nozzle for applying liquid to foliage.

It is an additional object to provide an agricultural spraying system incorporating such a nozzle.

It is a further object to provide a method for spraying foliage.

It is another object to provide a method of improving the efficiency of an agricultural spraying process.

It is yet an additional object to provide a nozzle for reducing the particle size of droplets emerging from a spraying apparatus.

It is yet a further object to provide a method for reducing the particle size of droplets emerging from a spraying apparatus.

It is yet another object to provide a spraying system having increased specificity for living foliage.

An additional object is to provide a method of reducing fouling of lines used to carry liquid to be sprayed.

Another object is to reduce the quantity of liquid required to achieve a desired coverage of foliage to be sprayed.

These objects and others are attained by the present invention, a spraying nozzle, system, and associated methods for applying a liquid to foliage. Throughout the word foliage is to be construed to include living plant material, including, but not limited to, leaves, stems, branches, and trunks. The system comprises a container that is adapted for holding a liquid. The container has an opening. The system also comprises a nozzle that includes a spray tip at an upstream end that has an orifice. The nozzle comprises an inert material and a magnet that is affixed adjacent the orifice along the liquid pathway.

A line having a lumen is affixable at an upstream end to the container and to the nozzle at a downstream end. The lumen is in communication with the container's opening and also with the to nozzle orifice.

Means are provided in the system for pumping liquid from the container through the line and out the nozzle orifice. The liquid, on its way out the nozzle orifice, passes by and contacts the magnet and is subject to the magnetic field, which affects the liquid droplets by orienting the dipoles of the molecules comprising the liquid, which serves to reduce the droplet size owing to mutual repulsion, creating a "cloud" of spray. The smaller droplets are better able to penetrate smaller spaces in the foliage such as insect habitats and difficult-to-access foliage pockets. The temporary magnetization also increases the attraction of the droplets for the foliage, which thereby further increases the efficiency of spraying and coverage achieved.

The features that characterize the invention, both as to organization and method of operation, together with further objects and advantages thereof, will be better understood from the following description used in conjunction with the accompanying drawing. It is to be expressly understood that the drawing is for the purpose of illustration and description and is not intended as a definition of the limits of the invention. These and other objects attained, and advantages offered, by the present invention will become more fully apparent as the description that now follows is read in conjunction with the accompanying drawing.

BRIEF DESCRIPTION OF THE DRAWINGS

FIG. 1 is a schematic diagram of the agricultural spraying system of the present invention.

FIG. 2 is an exploded view of a first embodiment of the spray nozzle.

FIG. 3 is an exploded view of a second embodiment of the spray nozzle.

DETAILED DESCRIPTION OF THE PREFERRED EMBODIMENTS

A description of the preferred embodiments of the present invention will now be presented with reference to FIGS. 1–3.

The agricultural spraying system 10 of the present invention in a preferred embodiment includes a vehicle 90 that is drivable adjacent rows of crops 91, typically along pathways 92 between rows of crops such as trees 93. This is not intended as a limitation, however, as individual plants, trees, or bushes can also be sprayed with the system 10. Means 94 for sensing a location of foliage such as is known in the art may also be positioned on the vehicle 90. Such means 94 may also be adapted to control the spraying nozzles to be described herein for preferentially spraying the sensed location of the crops 91 desired to be sprayed.

The vehicle 90 has removably affixed thereto a container 12 for holding the liquid 14 to be sprayed, which may comprise, for example, a biocide or a fertilizer. Preferably the container 12 comprises a magnetically inert material such as a plastic, and may contain means for agitating or stirring the container's contents, which may be desirable if, for example, the contents do not readily stay in solution.

The container 12 has an opening 16 into which is coupled a first line 18 leading to a pump 19, which is mounted on the vehicle 90. From the pump 19 lead a plurality of lines 20 for distributing liquid 14 to a plurality of nozzles 22 (52 in a second embodiment, FIG. 3), across which air is directed between vanes 23 by at least ore fan (not shown) for atomizing the liquid 14. Fans such as are known in the art may be employed as desirable for a particular crop, such as fans ranging from 24 to 48 inches. It is preferred to provide entrained turbulent air at 100+ mph, although this is not intended as a limitation.

Each nozzle 22,52 in a first (FIG. 2) and a second embodiment (FIG. 3), respectively, comprises a nozzle body 26,56 that has a coupler for coupling to a line 20 such as is well known in the art at an upstream end 27,57 and a lumen 28,58. The upstream end exterior surface 29,59 may comprise, for example, a hex face. At the downstream end 30,60 are an external, male threaded portion 31,61 and an internal, female threaded portion 32,62.

Threadable into the internal threaded portion 32,62 of the nozzle body 26,56 is a generally cylindrical strainer 33,63 having a lumen 34,64 that contains a filter such as a 100-mesh filter (not shown) for filtering liquid passing through the lumen 34,64. The lumen 34,64, when the strainer 33,63 is screwed into the nozzle body 26,56, is in communication with the nozzle body's lumen 28,58. The strainer 33,63 also has a head 35,65 at the downstream end.

A spray tip 36,66 is positionable with the strainer head 35,65 at an upstream end, and has a lumen 38,68 in communication with the strainer's lumen 34,64 leading to an orifice 39,69 configured to disperse liquid passing therethrough. The first embodiment of the spray tip 36 comprises a slotted member for producing a generally planar spray, while the second embodiment of the spray tip 66 includes a generally toroidal core 361 positionable in abutting relation to the strainer head 65, followed downstream by a disc 362 positionable downstream of the core 361. The lumina 363,68 of these members, respectively, are configured for producing a desired spray pattern, such as is offered by Precision Lumark Nozzles (Precision Fitting and Valve Co., Inc., Farmington, Minn.). Many such nozzles are known in the art, however, and these are not intended as limitations on the present invention.

A cap 40,70 anchors the spray tip 36,66 and strainer 33,63 in engagement with the nozzle body 26,56 and has a lumen 41,71 in communication with the spray tip's orifice 39,69. The lumen's inner surface comprises a female threaded portion 42,72 for engaging the nozzle body's male threaded portion 31,61. This portion of the lumen 41,71 is sufficiently large to encompass the strainer 33,63 and spray tip 36,66 and other intervening elements, and thus hold them in place when the threaded portions 42,72;31,61 are engaged.

Preferably the nozzle body 26,56, strainer 33,63, spray tip 36,66, and cap 40,70 comprise an inert material, such as a ceramic, carbide, or polyglass, although these materials are not intended as limitations.

The nozzle 22,52 additionally comprises a magnet positionable adjacent the spray tip 36,66. In the first embodiment 22 a plurality of bar magnets 43 are positionable in abutting relation to and within the strainer 33. The bar magnets 43 each has a positive/negative axis, and the negative pole 44 faces in a common direction for all bar magnets 43, preferably toward the spray tip's orifice 39.

In the second embodiment 52 a toroidal magnet 73 is placed between the core 361 and the disc 362, with the negative face 74 toward the spray tip's orifice 69. Alternatively, the toroidal magnet may have an outer diameter dimensioned for placement within the strainer 63 upstream of the head 65. The toroidal magnet 73 may also comprise a plurality of toroidal magnets 73,73',73" stacked so that their polarities are aligned in a common direction. An exemplary toroidal magnet 73 comprises a neodymium ring (The Magnet Source, Miami, Fla.), such as a ⅜-in. "donut" magnet, although this is not intended as a limitation.

In addition to placing a magnet or plurality of magnets adjacent the nozzle, magnets 43,73 may also be placed in the lumen of the line(s) 20, in the liquid container 12 upstream of the line(s) 20, and/or also on the spray vanes. In any placement, however, it is preferred that the magnets are in direct contact with the liquid pathway.

Test Results

A controlled test was performed by the University of Florida Cooperative Extension Service Institute of Food and Agricultural Sciences at a fernery in Volusia County, Fla. As is shown in Table 1, which is a compilation of experiments undertaken over a six-week period, the percent of leaves infected has been reduced (29%) with the use of the system and method of the present invention. Even more dramatic is the reduction in average percent of leaf area damaged (73%).

TABLE 1

Data from Controlled Experiment on Results of Spraying a Crop of Ferns with the System of the Present Invention

| Land area | Leaves sampled | Leaves infected (%) | Leaf area damaged (%) |
|---|---|---|---|
| Control | 115 | 23.48 | 1.43 |
| Expt. | 167 | 24.55 | 0.75 |
| Control | 107 | 13.0 | 1.58 |
| Expt. | 123 | 16.9 | 0.66 |
| Control | 107 | 14.0 | 0.96 |
| Expt. | 128 | 7.03 | 0.17 |
| Control | 135 | 14.81 | 0.21 |
| Expt. | 129 | 14.73 | 0.46 |
| Control | 136 | 24.3 | 2.89 |
| Expt. | 127 | 11.02 | 0.31 |
| Control | 134 | 36.57 | 6.77 |
| Expt. | 129 | 15.50 | 1.35 |
| Control (avg.) | | 21.03 | 2.31 |
| Expt. (avg.) | | 14.96 | 0.62 |
| Avg. dif. (%) | | −29% | −73% |

Table 2 shows results using the present invention as compared with other published data.

TABLE 2

Published Data on Agricultural Coverage with Conventional Air Blast Sprayer vs. Present Invention

| | |
|---|---|
| Trees, 35' high[a] | |
| Helicopter | |
| FMC PTO | 57% |
| FMC Engine | 92% |
| Magnetic | 93% |
| Ratio spray coverage, top to bottom of trees | |
| Conventional air blast sprayer[b] | 51% |
| Magnetic | 97% |
| Variation of control of fungi on avocadoes w. copper | |
| Conventional[c] | 50% |
| Magnetic | |

TABLE 2-continued Published Data on Agricultural Coverage
with Conventional Air Blast Sprayer vs. Present Invention

| | |
|---|---|
| Effect of growth regulators (Giberilum) - % increase over control | |
| Conventional[d] | 65% |
| Magnetic | 130% |
| Percentage of droplet according to size found in insect microhabitat[e] | |
| 100 μm | 0% |
| 50 μm | 99% |
| 30 μm | 98% |
| Savings on chemical over conventional sprayer | 50–75% |
| Coverage efficiency | |
| Conventional sprayer | 44% |
| Magnetic | 96% |

[a]University of California, Haire.
[b]Guelph University, Frank.
[c]University of Florida, McMillan.
[d]FMC, Lane.
[e]Michigan State University, Ayers.

It is believed that the transiently magnetized particles are attracted to the living portions of the plants toward which they are aimed, including the leaves, stems, and trunks. It is preferable to tailor the force field of the spray particles to the intended target, with 30 μm believed best for reaching microhabitats of insects.

Tests have been performed with the use of fluorescent dye incorporated in the sprayed liquid to determine coverage and drift. These tests resulted in a finding that 98% of the magnetized spray reaches and adheres to foliage surfaces, on both top and bottom surfaces thereof. A wind of 12 mph did not substantially affect spray drift. No spray was found on the ground, and the 2% not found on the target foliage could not be accounted for.

From the data collected in the tables it may be seen that the magnetic system and methods of the present invention confer a number of advantages that are economically and environmentally beneficial: coverage is increased, enabling a reduction in amount of chemical used; penetration into insect microhabitats is increased owing to a decrease in droplet size emitted by the magnetic sprayer; growth improvement is enhanced owing to increased coverage and penetration; sprayed substances are found primarily on foliage and not on the ground, as indicated by inclusion of fluorescent dye in the sprayed liquid.

In summary, then, the tests have proved that the magnetic spray is advantageous over conventional spraying apparatus owing to only 2% drift, 98% coverage, and 75% reduced chemical, resulting in better control of pests. Also, fewer spray applications are required, as field tests showed that the interval between spray applications can be increased without lessening the quality of the crop. Such an interval can be up to three times as long as typically used.

It may be appreciated by one skilled in the art that additional embodiments may be contemplated, including other orientations of a magnet or plurality of magnets on the nozzle or along other portions of the line.

In the foregoing description, certain terms have been used for brevity, clarity, and understanding, but no unnecessary limitations are to be implied therefrom beyond the requirements of the prior art, because such words are used for description purposes herein and are intended to be broadly construed. Moreover, the embodiments of the apparatus illustrated and described herein are by way of example, and the scope of the invention is not limited to the exact details of construction.

Having now described the invention, the construction, the operation and use of preferred embodiment thereof, and the advantageous new and useful results obtained thereby, the new and useful constructions, and reasonable mechanical equivalents thereof obvious to those skilled in the art, are set forth in the appended claims.

What is claimed is:

1. A nozzle for applying liquid under pressure to foliage comprising:

a nozzle body having means for coupling to a line at an upstream end and a lumen;

a spray tip at a downstream end having an orifice;

means for mating the nozzle body with the spray tip, the mating means comprising a strainer comprising a generally cylindrical portion having a strainer lumen in communication with the nozzle body lumen and the spray tip orifice and the strainer further comprising means for filtering liquid passing through the strainer lumen; and a magnet positionable adjacent the spray tip along a liquid pathway comprising a toroidal element dimensioned to fit within the strainer lumen;

wherein the spray tip, the coupling means, and the nozzle body comprise a substantially inert material.

2. The nozzle recited in claim 1, wherein the magnet comprises a plurality of toroidal elements, each having a negative face and a positive face, the hole extending therebetween, the negative faces all facing in a common direction.

3. The nozzle recited in claim 1, further comprising a cap having means for anchoring the spray tip and strainer in engagement with the nozzle body and further having a lumen in communication with the spray tip orifice.

4. The nozzle recited in claim 1, wherein the magnet comprises a generally toroidal element positionable between a downstream end of the strainer and an upstream end of the spray tip, the toroidal element having a hole therethrough in communication with the strainer lumen and the spray tip orifice.

5. A nozzle for applying liquid under pressure to foliage comprising:

a nozzle body having means for coupling to a line at an upstream end and a lumen;

a spray tip at a downstream end having an orifice;

means for mating the nozzle body with the spray tip, the mating means having a lumen and comprising a strainer having means for filtering liquid passing through the mating means lumen, the strainer further having a strainer lumen in communication with the nozzle body lumen and the spray tip orifice; and a plurality of bar magnets positionable adjacent the spray tip along a liquid pathway, each positionable within the strainer, the bar magnets each having a positive/negative axis, a negative pole facing in a common direction for all bar magnets.

wherein the spray tip, the coupling means, and the nozzle body comprise a substantially inert material.

6. A system for spraying foliage comprising:

a container for holding liquid and having an opening;

a nozzle comprising a spray tip at an upstream end and having an orifice and comprising an inert material and a magnet affixed adjacent the orifice along a liquid pathway;

an additional magnet positionable adjacent the container opening;

a line having a lumen and affixable at an upstream end to the container and affixable to the nozzle at a downstream end, the lumen in communication with the container opening and with the nozzle orifice; and means for pumping liquid from the container through the line and out the nozzle orifice.

7. The system recited in claim 6, wherein the line comprises an inert material.

8. A system for spraying foliage comprising:

a container for holding liquid and having an opening;

a nozzle comprising a spray tip at an upstream end and having an orifice and comprising an inert material and a magnet affixed adjacent the orifice along a liquid pathway;

an additional magnet positionable within the line;

a line having a lumen and affixable at an upstream end to the container and affixable to the nozzle at a downstream end, the lumen in communication with the container opening and with the nozzle orifice; and means for pumping liquid from the container through the line and out the nozzle orifice.

* * * * *